US012566427B2

(12) United States Patent
Gruener et al.

(10) Patent No.:  US 12,566,427 B2
(45) Date of Patent:       Mar. 3, 2026

(54) METHOD AND SYSTEM FOR SYNCHRONIZING CONFIGURATION DATA IN A PLANT

(71) Applicant: ABB Schweiz AG, Baden (CH)

(72) Inventors: Sten Gruener, Laudenbach (DE);
Heiko Koziolek, Karlsruhe (DE);
Julius Rueckert, Langen (DE)

(73) Assignee: ABB Schweiz AG, Baden (CH)

( * ) Notice: Subject to any disclaimer, the term of this patent is extended or adjusted under 35 U.S.C. 154(b) by 317 days.

(21) Appl. No.: 17/724,708

(22) Filed: Apr. 20, 2022

(65) Prior Publication Data

US 2022/0342397 A1      Oct. 27, 2022

(30) Foreign Application Priority Data

Apr. 22, 2021    (EP) ..................................... 21169899

(51) Int. Cl.
*G05B 19/418*        (2006.01)
*H04L 41/084*        (2022.01)
(52) U.S. Cl.
CPC .... *G05B 19/41845* (2013.01); *H04L 41/0846* (2013.01); *G05B 2219/33125* (2013.01)
(58) Field of Classification Search
CPC .... G05B 19/41845; G05B 2219/33125; G05B 2219/31213; G05B 2219/31215;

(Continued)

(56) References Cited

U.S. PATENT DOCUMENTS 8,539,567 B1 *   9/2013   Logue ..................... H04L 63/08
                                                          709/227
8,635,373 B1 *   1/2014   Supramaniam ......... H04L 63/08
                                                          709/248

(Continued)

FOREIGN PATENT DOCUMENTS

CN          101557344 A       10/2009
CN          102571905 A        7/2012
JP            4768085 B2        9/2011

OTHER PUBLICATIONS

European Patent Office, Extended European Search Report in European Patent Application No. 21169899.8, 7 pp. (Oct. 19, 2021).

(Continued)

*Primary Examiner* — Brian J. Gillis
*Assistant Examiner* — Juan C Turriate Gastulo
(74) *Attorney, Agent, or Firm* — Fitch Even Tabin & Flannery LLP

(57)            ABSTRACT
A system and method includes partitioning a network into first and second sub-networks connected by a network connection. A first component with first configuration data and a first local server are located in the first sub-network; a second component with second configuration data and a second local server are located in the second sub-network. The first configuration data is stored on the first and second local servers. The network connection is interrupted and the first configuration data is updated on the first local server. The network connection is re-connected, and if the first configuration data on the second local server is unchanged, the first configuration data on the second local server is overwritten.

17 Claims, 7 Drawing Sheets

(58) Field of Classification Search
CPC ...... G05B 19/4185; G05B 2219/33273; H04L
41/0846; H04L 67/1095; H04L 67/1097;
H04L 67/59; H04L 69/40; H04L 67/12;
G06F 11/0751; G06F 11/2094; G06F
11/2097
See application file for complete search history.

(56)                    References Cited

U.S. PATENT DOCUMENTS

| | | | |
|---|---|---|---|
| 9,396,216 B2 * | 7/2016 | Barreto | G06F 16/1734 |
| 9,633,037 B2 * | 4/2017 | Smith | G06F 16/178 |
| 2009/0070337 A1 * | 3/2009 | Romem | G06F 16/27 |
| 2009/0193107 A1 * | 7/2009 | Srinivasan | H04L 67/59 |
| | | | 709/223 |
| 2009/0210426 A1 | 8/2009 | Kulakov et al. | |
| 2009/0285126 A1 * | 11/2009 | Lu | H04L 61/5061 |
| | | | 370/255 |
| 2018/0032257 A1 * | 2/2018 | Xiang | G06F 3/067 |
| 2023/0394759 A1 * | 12/2023 | Aoki | H04L 67/1095 |

OTHER PUBLICATIONS

The Patent Office of the People's Republic of China, Office Action
in Chinese Patent Application No. 202210418402.8, 16 pp. (Apr. 1,
2025).

\* cited by examiner

METHOD AND SYSTEM FOR SYNCHRONIZING CONFIGURATION DATA IN A PLANT

CROSS-REFERENCE TO RELATED APPLICATIONS

This patent application claims priority to European Patent Application No. 21169899.8, filed on Apr. 22, 2021, which is incorporated herein in its entirety by reference.

FIELD OF THE DISCLOSURE

The present disclosure generally relates to the field of industrial plants and, more particularly, to configuration data of components within an industrial plant and their synchronization.

BACKGROUND OF THE INVENTION

Industrial plants, which may be configured for manufacturing and/or running chemical, mechanical, or other processes, may be designed for dynamic reconfiguration. For this, the plants' components may be reconfigured by altering their configuration data. Particularly in plants with distributed control systems, said configuration data and/or replicas of the configuration data may be distributed over several servers.

BRIEF SUMMARY OF THE INVENTION

The present disclosure, in one general aspect, describes a method for synchronizing configuration data in a plant, which are distributed over several servers. This objective is achieved by the subject-matter of the independent claims. Further embodiments are evident from the dependent claims and the following description.

One aspect relates to a method for synchronizing configuration data of components within an industrial plant. The method comprises the steps of: partitioning a network in the industrial plant into a first sub-network and a second sub-network, said sub-networks connected by a network connection, wherein a first component, comprising at least a first configuration data, and a first local server are located in the first sub-network, and a second component, comprising at least a second configuration data, and a second local server are located in the second sub-network; storing the first configuration data on the first local server and, via the network connection, on the second local server, and storing the second configuration data on the second local server and, via the network connection, on the first local server; and interrupting the network connection. The method further comprises the steps of updating, on the first local server, the first configuration data and the second configuration data; re-connecting the network connection; and while the first configuration data on the second local server is unchanged, overwriting the first configuration data on the second local server by the updated first configuration data.

BRIEF DESCRIPTION OF THE SEVERAL VIEWS OF THE DRAWING(S)

DETAILED DESCRIPTION OF THE INVENTION

Figure 1:
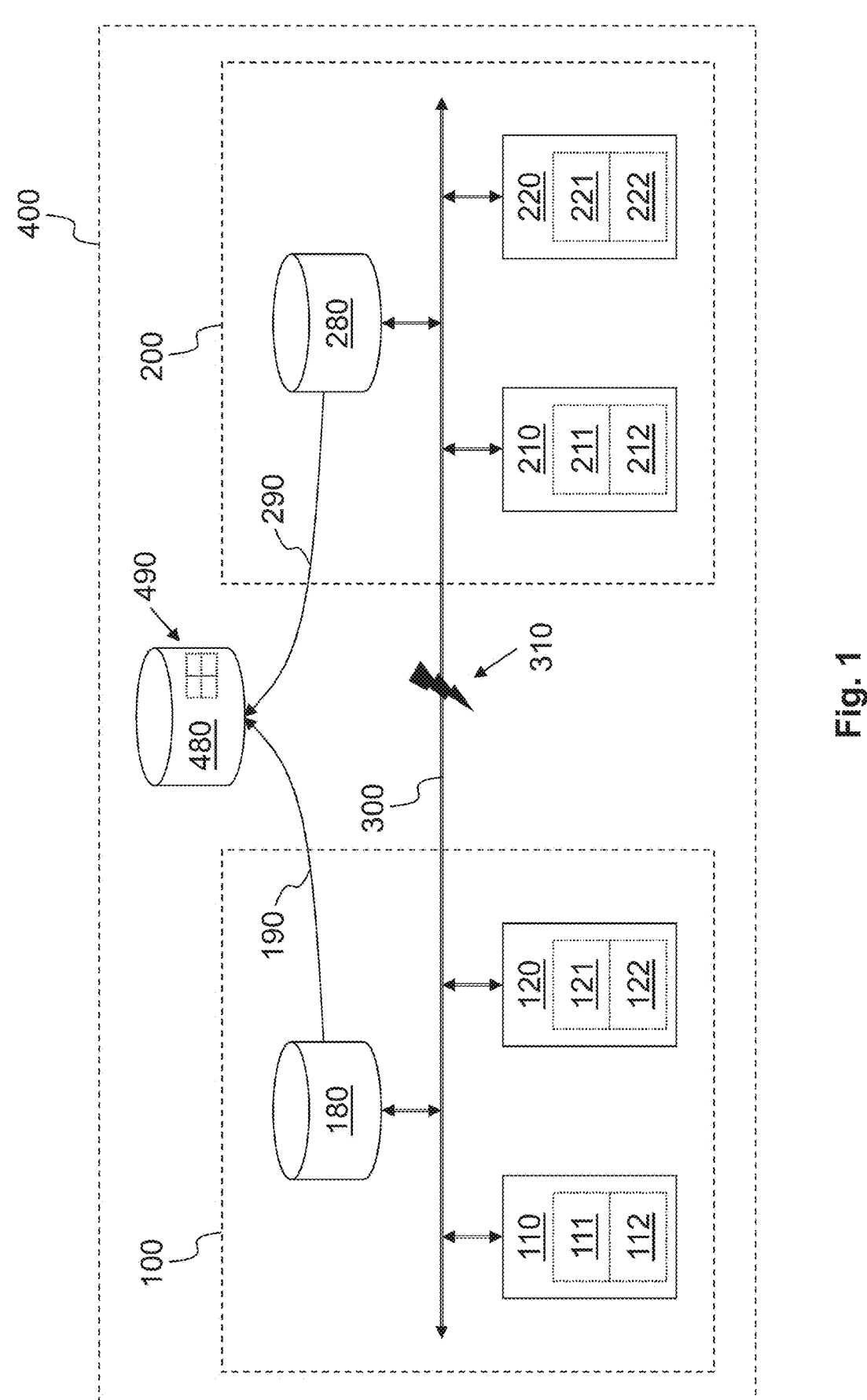
FIG. 1 is a schematic representation of a network of a plant according to an embodiment of the present disclosure.

FIG. 1 shows schematically a network 400 of an industrial plant according to an embodiment. The network 400 comprises a first sub-network 100 and a second sub-network 200, and—at least in some embodiments—further sub-networks (not shown in FIG. 1). The first sub-network 100 comprises at least one first component 110, but there may be one or more further first components 120. The first components 110, 120 comprise at least a first configuration data 111, 112, 121, 122. For example, an electric motor as a component 110 may comprise a maximum allowed speed 111 and a maximum allowed power 112; a control element as a component 120 may comprise a control characteristic 121 and a filter function 122. The first sub-network 100 further comprises at least one first local server 180, which is located in the first sub-network 100, and where the first configuration data 111, 112, 121, 122 are stored on. Analogously, the second sub-network 200 has at least a second component 210, 220, which comprises at least a second configuration data 211, 212, 221, 222, and a second local server 280; all of them are located in the second sub-network 200.

The first sub-network 100 and the second sub-network 200 are connected by a network connection 300. The second local server 280 has, besides "its own" second configuration data 211, 212, 221, 222, at least some of the first configuration data 111, 112, 121, 122 stored. On the other hand, the first local server 180 has, besides "its own" first configuration data 111, 112, 121, 122, at least some of the second configuration data 211, 212, 221, 222 stored. The "not-own" configuration data are stored via the network connection 300.

Sometimes, the network connection 300 between sub-networks 100 and 200 may be interrupted or broken, e.g. caused by a distortion or a hardware failure 310. During the interrupt, at least some of the first and the second configuration data 111-222 may be updated. After having repaired the distortion or the hardware failure 310, the network connection 300 is re-connected and the updated configuration data need to be synchronized, for re-establishing consistency of these data among all local servers 180, 280 (and possibly further ones). The consistency may be achieved by applying one strategy, e.g. over the complete lifetime of this sub-network, network, or plant. The consistency strategy may be selected among several strategies and/or may be varied over the lifetime of the sub-network, network, or plant. The consistency strategy may comprise a "checking unchanged strategy", i.e. to check if the first configuration data 111-122 on the second local server 280 is unchanged, and, if yes, to overwrite the first configuration data 111-122 on the second local server 280 (or on all the other local servers) by the updated first configuration data 111-122. The consistency strategy may comprise to check if the first configuration data on the second local server 280 is older than the updated first configuration data 111-122, and, if yes, to overwrite the first configuration data 111-122 on the second local server 280 by the updated first configuration data 111-122. The consistency strategy may comprise, if the first configuration data 111-122 on the second local server 280 has been changed, to overwrite the first configuration data 111-122 on the second local server 280 by the updated first configuration data 111-122.

The network 400 may further comprise a central server 480. This central server 480 may be configured for storing a copy of the configuration data 111-222 and of the updated first configuration data 111-222, when overwriting first configuration data 111-222. The copy of the configuration data 111-222 may further comprise a timestamp of an overwriting time of said configuration data, and of an interrupting time and a re-connecting time of the network connection 300. Besides, the central server 480 may comprise a journal 490. The journal 490 may hold a copy of said configuration data 111-222 and, optionally, the timestamp, the interrupting time and the re-connecting time are stored in the journal 490. The journal 490 may advantageously be used as a basis for checking said configuration data 111-222. The checking of said configuration data may, e.g., comprise a checking for an alarm, a correction, a learning system, and/or other events that have occurred on the network or plant.

Figure 2:
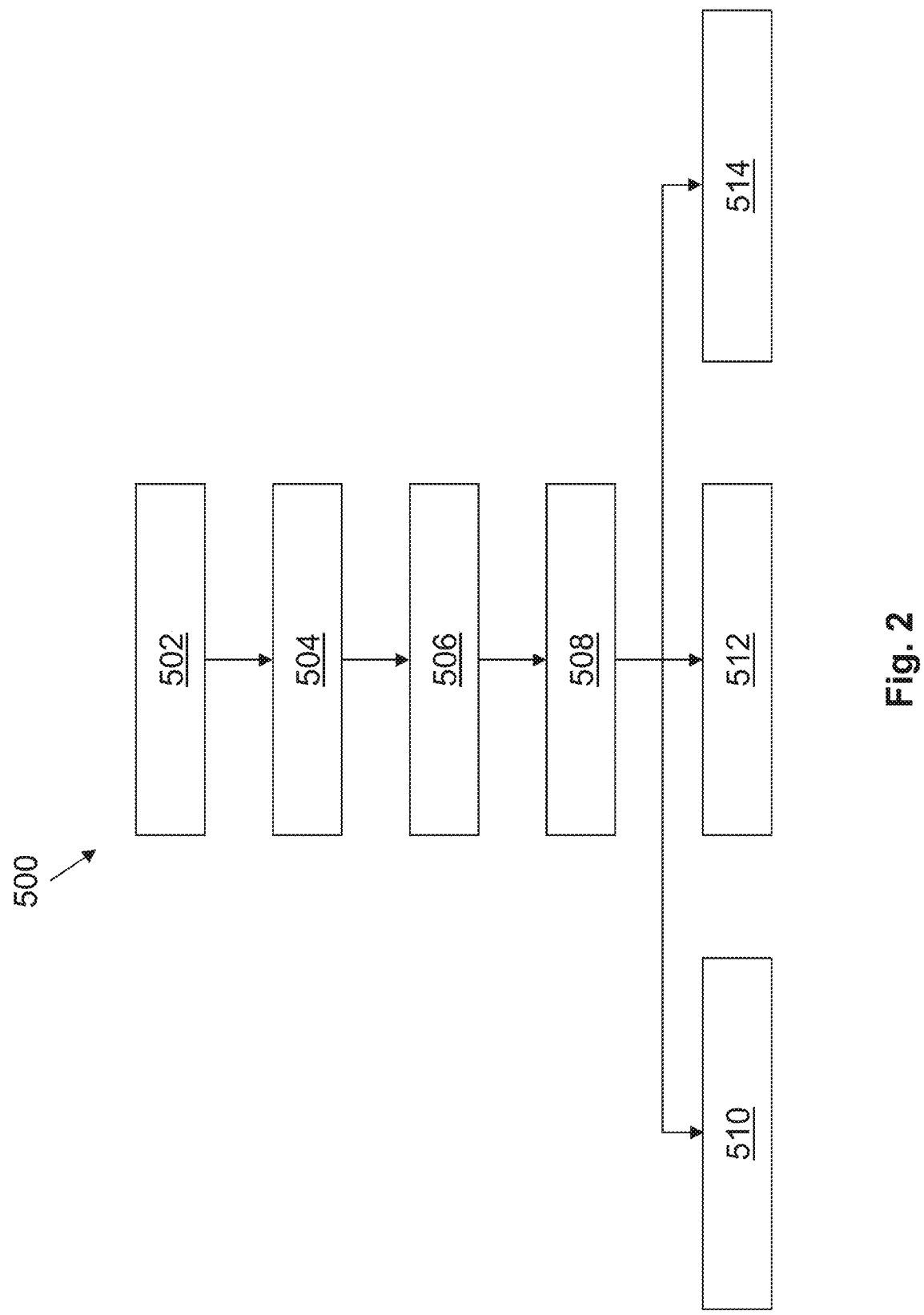
FIG. 2 is a flow diagram according to an embodiment of the present disclosure.

FIG. 2 shows a flow diagram 500, according to an embodiment, of a method for synchronizing configuration data 111-222 (see, e.g., FIG. 1) of components 110, 120, 210, 220 within a network 400 in an industrial plant. In a step 502, the network 400 is partitioned into a first sub-network 100 and a second sub-network 200, said sub-networks 100, 200 connected by a network connection 300. The first sub-network 100 comprises at least a first local server 180 and a first component 110, 120, comprising at least a first configuration data 111, 112, 121, 122. The second local server 280 comprises at least a second local server 280 and a second component 210, 220, comprising at least a second configuration data 211, 212, 221, 222.

In a step 504, the first configuration data 111, 112, 121, 122 is or are stored on the first local server 180 and, via the network connection 300, on the second local server 280. Furthermore, the second configuration data 211, 212, 221, 222 is or are stored on the second local server 280 and, via the network connection 300, on the first local server 180.

In a step 506, the network connection 300 is interrupted. During this interrupt, at least some of the first and the second configuration data 111-222 may be updated. After remediating the interrupt, the network connection 300, in a step 508, is re-connected. Then, the updated configuration data need to be synchronized, for re-establishing consistency of these data among all local servers 180, 280 (and possibly further ones). The consistency may be achieved by applying one strategy, e.g. over the complete lifetime of this sub-network, network, or plant. The consistency strategy may be selected among several strategies and/or may be varied over the lifetime of the sub-network, network, or plant.

The consistency strategy may comprise a step 510, comprising a "checking unchanged strategy", i.e. to check if the first configuration data 111-122 on the second local server 280 is unchanged, and, if yes, to overwrite the first configuration data 111-122 on the second local server 280 (or on all the other local servers) by the updated first configuration data 111-122. As an alternative, the consistency strategy may comprise a step 512, comprising to check if the first configuration data on the second local server 280 is older than the updated first configuration data 111-122, and, if yes, to overwrite the first configuration data 111-122 on the second local server 280 by the updated first configuration data 111-122. As a further alternative, the consistency strategy may comprise a step 512, comprising, if the first configuration data 111-122 on the second local server 280 has been changed, to overwrite the first configuration data 111-122 on the second local server 280 by the updated first configuration data 111-122.

Figures 3, 4:
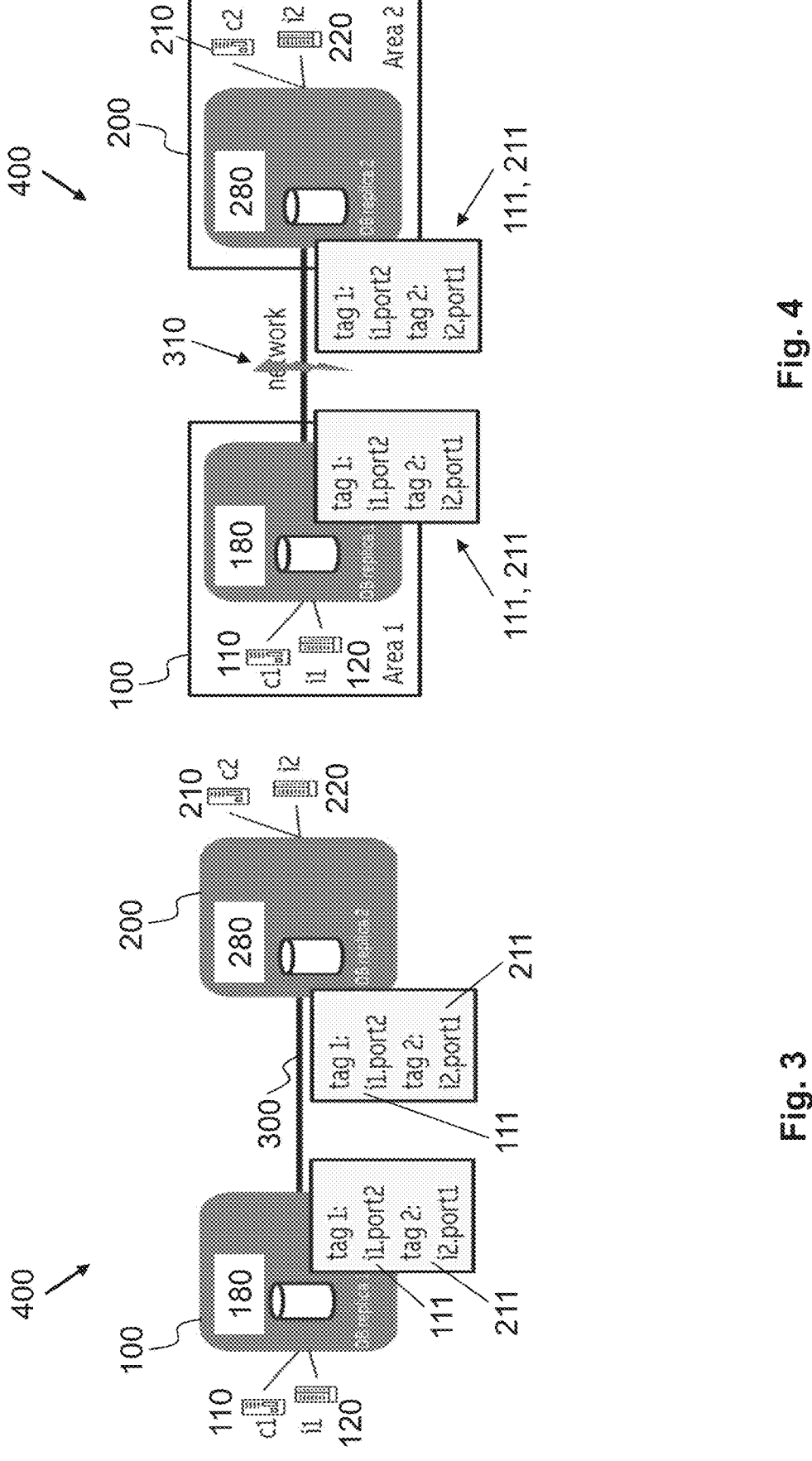
FIG. 3 is a schematic representation of a network of a plant according to a second embodiment of the present disclosure.
FIG. 4 is a schematic representation of a network of a plant according to a third embodiment of the present disclosure.

FIG. 3 shows schematically a network 400 of a plant according to an embodiment. The small example of FIG. 3 comprises, within first sub-network 100, one controller "c1" 110 and one network-attached remote I/O "i1" 120, which may have, e.g., multiple physical sensors or actuators that may be connected to its ports e.g. by means of a 4.20 mA current loop. To decouple control application from I/O port designation, a tag configuration database (DB) on a first local server 180 may be used. This DB may be used to resolve abstract tags, e.g., "tag 1" to specific ports of specific I/O connector. This means that in order to write to "tag 1", controller "c1" needs to query the database first to resolve that tag into a physical location "i1.port2". Tag information may be stored in a configuration database running on a computing node, e.g. on the first local server 180, a physical or a virtual PC or server. Note that "tags" are only one example of configuration data within the database, which may also include, e.g., network configuration data, credentials and further entities. To prevent the database from becoming a single point of failure, multiple instances of the database may be created and synchronized, as depicted in FIG. 3. 2in the example shown, two database replicas 180, 280 are deployed in two spatial areas—mapping to sub-networks 100, 200 of the plant —, suitable for hardware deployment. Hardware nodes are not necessarily servers: smaller devices like switches and industrial PCs may, additionally or as an alternative, be used as deployment targets for DB replicas, e.g. following the concept for fog computing. Areas can be, e.g., buildings, floors, cabinets, lines, or even same racks within a data center. Since areas are connected via networks 300, database replicas are synchronized and thus hold equal tag data. The area separation may be done according to a selection of rules and/or requirements; this may include to consider to available computing resources and/or networking infrastructure.

In FIG. 3, controllers and I/O connectors may have inner-area dependencies: e.g., "c1" 110 may read and write data, e.g. from inputs of connector "i1" 120. Furthermore, outer-area dependencies may be present, e.g. "tag 2" 211, for Area 1 or sub-network 100, in case c1 110 needs access to this tag. Synchronization problems may occur in case of network interruptions 310 between areas 100 and 200. For instance, an inconsistency—e.g. between "tag 2" 211 on second local server 280 and "tag 2" 211 (i.e. the replica) on first local server 180—may occur when the network interruption is resolved. For example, possibly conflicting changes to "tag 1" 111 in the first "own" sub-network 100 (e.g. located in Area 1) and "tag 1" 111 in the second "not-own" sub-network 200 (e.g. located in Area 2) may occur at a price of potential misconfiguration of the plant. One measure to cope with this may comprise a "purposely defined" partitioning the network 400 in the industrial plant, for instance into a first sub-network 100 and a second sub-network 200. Note that two sub-networks are only used as simplified examples; the partitioning may be applied to a plurality of sub-networks.

In cases when a spatial vicinity of the components ("spatial-deployment-aware distributed configuration storage") is used, spatial areas of the plant may be structured like this:

a) Existing engineering artifacts of the plant may be used as a basis. Each area may be associated with at least one computing node (e.g. 180, 280), which is physically located within this area (e.g. sub-network 100 or 200, respectively) and is connected to its infrastructure. Furthermore IT-equipment—like further computing node(s) and OT-equipment like controllers and I/O connectors that are operating within the area—may be mapped into the selected sub-network.

b) Additionally or as an alternative, sub-networks may be structured based on a network topology, logical, and/or other "vicinity" considerations. Using network scans, monitoring network activity, or accessing information from network devices or a central network control system, a network topology and/or a "logical" structure may be built up. Within a sub-network, placement of controllers may be indicated, remote I/O and interconnected equipment to different parts of the network, which can be used to define the sub-networks. This method may also be suitable, for example, for Ethernet-based networks. Routers and managed switches may be monitored by a centralized network controller and physical links may be detected, e.g., based on LLDP discovery. In networks with multiple Ethernet segments, IP-level routing information on the topology and the Ethernet-based connectivity may be used in combination. Thus, sub-networks—e.g. based on spatial areas—may be defined. One simple example may be sub-networks that are based on IP subnets or the Ethernet segments.

An example of such a resulting sub-network is depicted in FIG. 4, which shows schematically a network 400 of a plant with sub-networks 100 and 200, connected by network connection 300. The areas' descriptions may contain the included hardware in terms of IT-hardware (e.g., execution nodes for DB replicas) and OT-hardware (e.g., controllers and I/O connectors) that are, e.g., physically located in the respective area.

In FIG. 4, network 400 is partitioned into sub-networks 100 "Area 1" and 200 "Area 2". They comprise the first local server 180 ("Node A") and the second local server ("Node B"), respectively. Within a sub-network, different OT-equipment may be operating, e.g. controller/PLC "c1" 110 and I/O connector "i1" 120 in sub-network 100 and "c2" 210 and "i2" 220 in sub-network 200, respectively. Furthermore, for the DB a defined redundancy level may be selected, e.g. 2, meaning a requirement to enforce at least two DB replicas to be available in case of normal operation of inter-area networking.

A software component called partition manager may be deployed within each defined area, which gets activated after a network partition between areas is detected. The partition manager is depicted as part of local server 180 or 280, respectively. A software component called merging manager may be deployed within each defined area which may be activated after a network connectivity restoration. These logical entities may be run, for example, on one or more physical entities.

The partitioning and/or definition of the sub-networks 100 and 200 may be done using an engineering tool, e.g. by a web-based or desktop-based application software. This tool may further be used for the fusion of engineering artifacts, e.g. production and IT-networking, electrical communications etc., deployment of database replicas onto nodes and enforcement of the redundancy level is achieved using a distribution manager, e.g. Kubernetes or Docker Swarm in case DB replicas can be abstracted using containers.

Figures 5, 6:
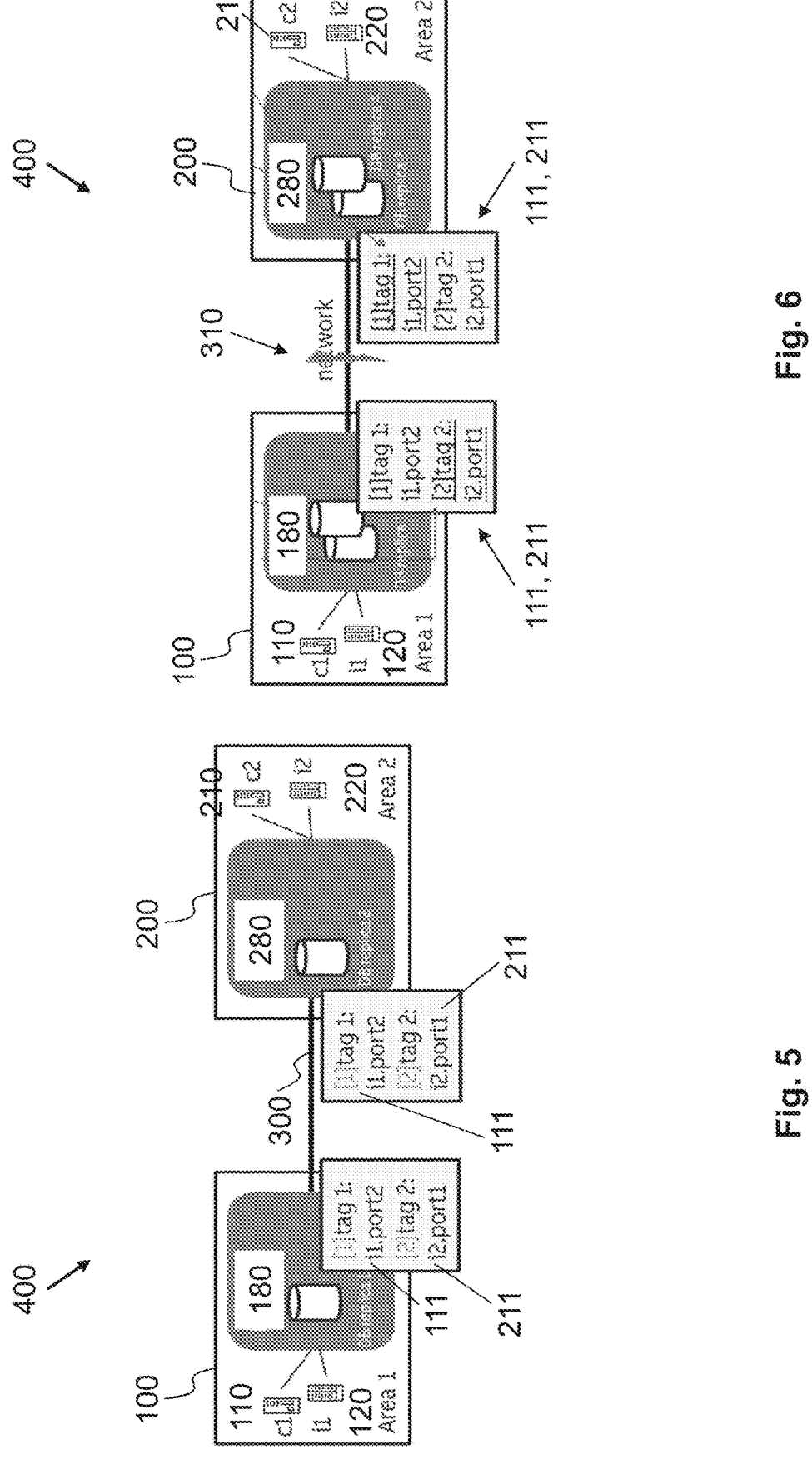
FIG. 5 is a schematic representation of a network of a plant according to a fourth embodiment of the present disclosure.
FIG. 6 is a schematic representation of a network of a plant according to a fifth embodiment of the present disclosure.

After the partitioning, ownership information may be attached to each configuration DB item, e.g. to a "tag". As shown in FIG. 5, tags may be "owned" by sub-network 100 or 200, respectively. These markers may be indicated by prefixes—i.e. "[1]" or "[2]"—within the database 180 or 280 in the figures. Further ownership markers may indicate roles, particular equipment like "i2" or "global" marker to indicate access only in case no network partition between database replicas was detected.

FIG. 6 shows schematically a network 400 of a plant according to an embodiment. A network interruption 310 may be detected using following techniques: (1) Using a "partition manager" of each sub-network, which monitors reachability of other areas via heartbeats. (2) A connection between partition manager and a network infrastructure, e.g. switches or routers, or a network control system exists which may be used to detect interruptions directly. In case of a detected network separation (shown as an interruption 310 in FIG. 6), a partition manager component is activated. The partition manager component may (a) spawn additional replicas within areas to fulfil redundancy requirements in case multiple physical nodes are available within the area; and (b) may lock entries in the database that do not belong to the sub-network or equipment within the area i.e. entries that are not owned by the sub-network. In FIG. 6, two more replicas are spawned within the areas (also possibly on different computation nodes within the area). And, tags within the database replicas are locked (indicated by underlined entries).

Figures 7, 8:
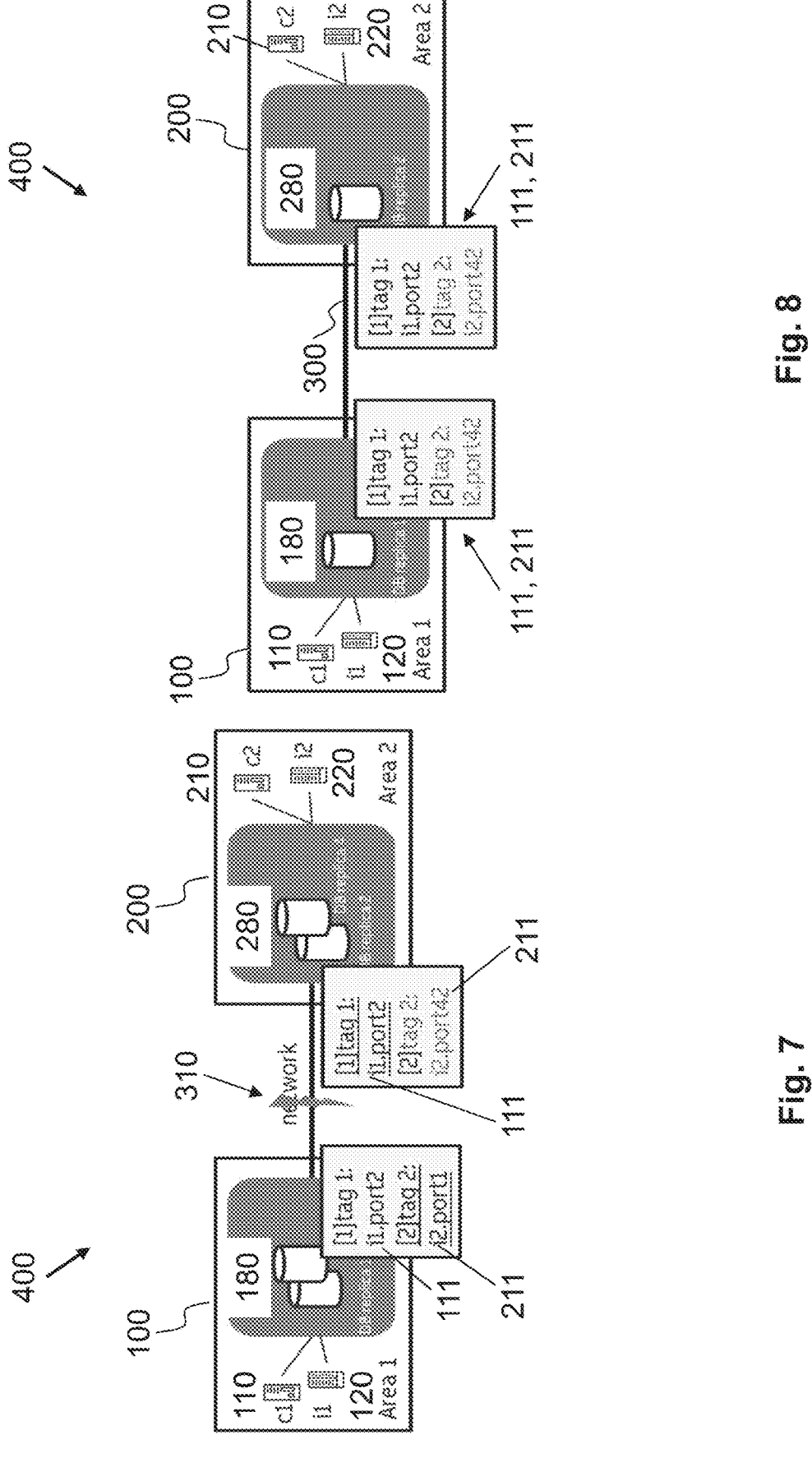
FIG. 7 is a schematic representation of a network of a plant according to a sixth embodiment of the present disclosure.
FIG. 8 is a schematic representation of a network of a plant according to a seventh embodiment of the present disclosure.

After interrupting the network connection 300 by interruption 310, reconfiguration of the plant's areas within those areas is still possible, for example "tag 2" in Area 2 can be changed to point to "i2.port42"; see FIG. 7.

After the re-connecting of network connection 300 between sub-networks 100 and 200, the merging manager of two areas may be activated. As shown in FIG. 8, this merging manager is configured to (a) Deduce redundancy to match new networking structure, and (b) Merge the content of two database replicas based on ownership information, ownership tags allow automatic conflict resolution since there one authoritative information source per entry. Optionally, merging can be manually confirmed or discarded, e.g. by an operator. (c) Unlock previously locked database entries that are owned by respective manager. As a result, replica numbers are reduced to 1 per area again; tag 2 entry has been copied over to DB replica 1, as it is owned by area 2; and all tags within the database are unlocked. Consistent state within the plant configuration is restored again.

Figures 9, 10:
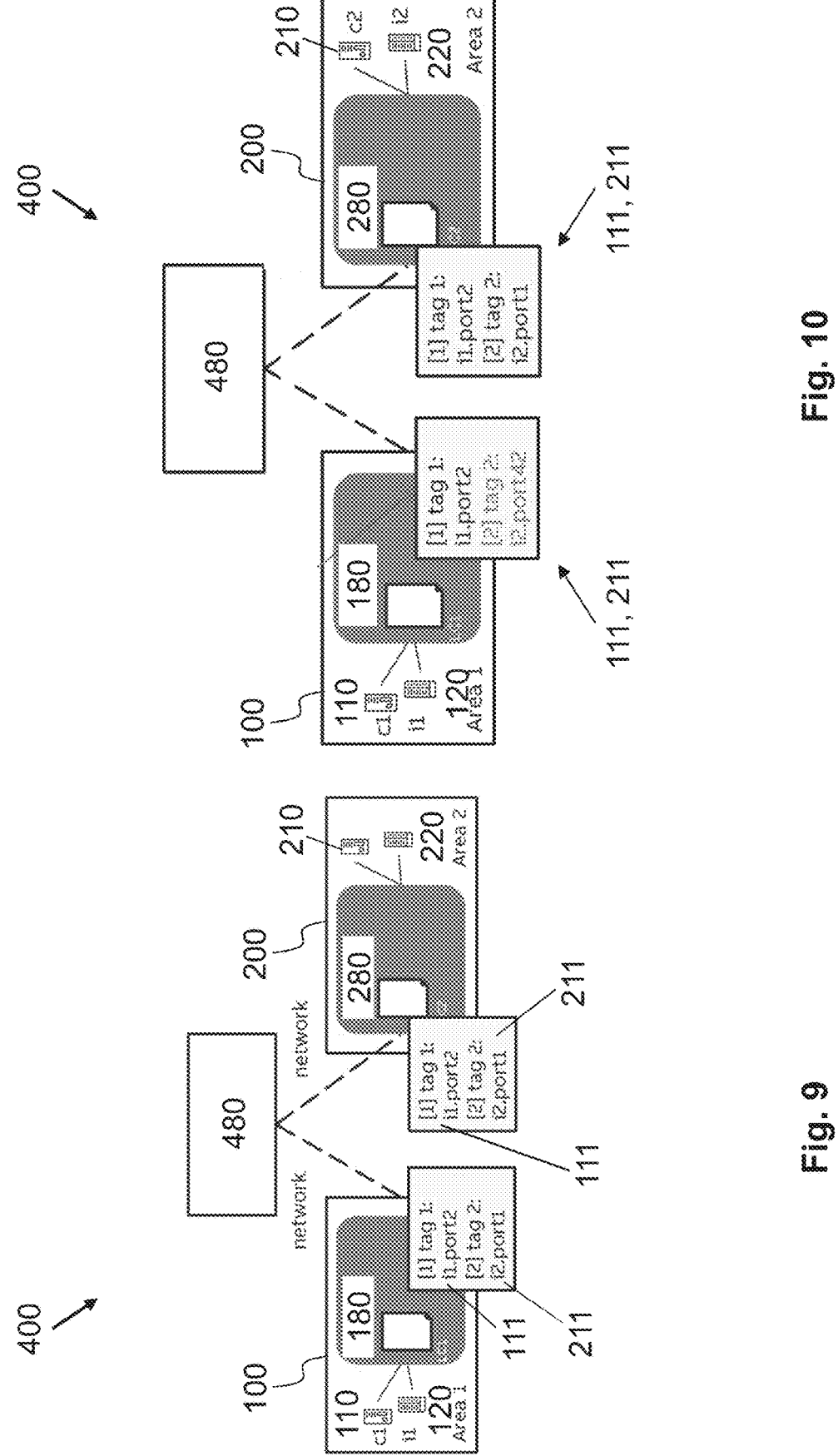
FIG. 9 is a schematic representation of a network of a plant according to an eighth embodiment of the present disclosure.
FIG. 10 is a schematic representation of a network of a plant according to a ninth embodiment of the present disclosure.

FIG. 9 shows schematically a network 400 of a plant according to an embodiment.

In case a distributed version-control system is used to store the configuration, such a small ("minimal") configuration may be used. There, each of the sub-networks 100 and

200 may hold a local copy (LC) of the configuration data or engineering data. This data will eventually be synchronized with a central versioning server. (An alternative may comprise a "fully-decentralized" strategy.) In at least some embodiments of this principle, there may be no need for a persistence online connection between the LCs. Conflicting changes may be made in each LC, e.g. changing tag1 111 to hold a conflicting mapping of I/O and port. In this case, the merging manager may be used (1) either to prevent those changes to be introduced in the engineering artifacts, or (2) to allow (semi-)automatic merging of engineering data using ownership information which is defined based on the plant segmentation.

FIG. 10 shows schematically a network 400 of a plant according to an embodiment. This figure serves to illustrate a so-called "pre-commit workflow". Here, a component or client from sub-network 100 attempts to change "tag 2", an artifact which is owned by sub-network 200. Before committing to the versioning server, a check of ownership is performed by the merging manager 180 of sub-network 100. Thus, merging manager 180 may detect the change of non-owned information and may consult the merging manager 280 of sub-network 200, which needs to approve the change. This may comprise to involve an engineering team of sub-network 200. Until then the commit is staged or rejected.

Figure 11:
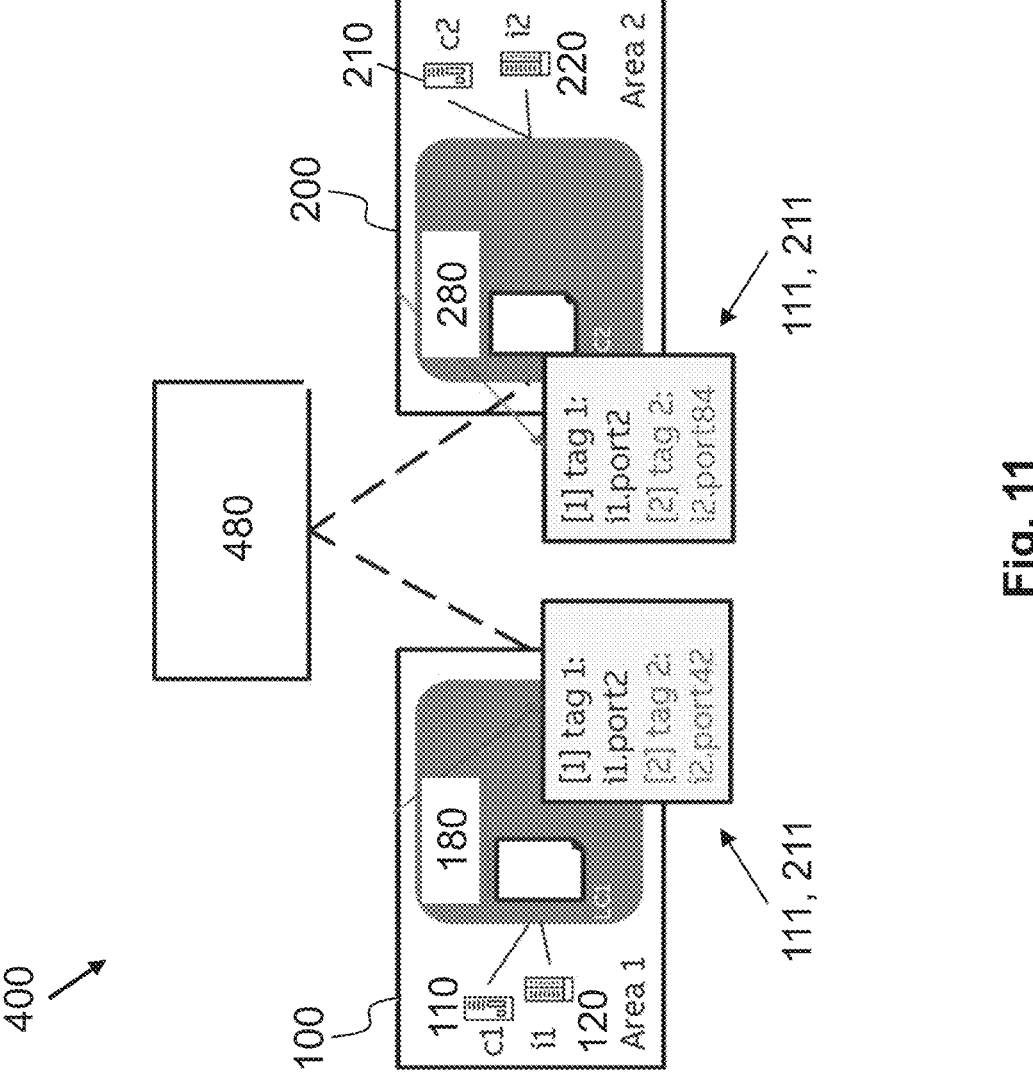
FIG. 11 is a schematic representation of a network of a plant according to a tenth embodiment of the present disclosure.

Alternatively, in case a conflicting commit has already been pushed, a merge process might be needed as depicted in FIG. 11. In case two conflicting assignments are available in LCs, merging managers 180 and 280 may detect an ownership information and perform automatic merging. The merging managers 180 and 280 may be implemented as dedicated servers, or as a functionality that is integrated in one or more of the computing machines of the plant. In the example, the assignment of "tag 2" in sub-network 200 will have priority over the "tag 2" assignment in sub-network 100, since it comes from the "owning" sub-network 200. Therefore, both managers may take over the assignment of "tag 2", possibly without manual intervention of an engineer. In at least embodiments, the merging may be recorded in a journal 490, for instance located in a central server 480.

One aspect relates to a method for synchronizing configuration data of components within an industrial plant. The method comprises the steps of:

partitioning a network in the industrial plant into a first sub-network and a second sub-network, said sub-networks connected by a network connection, wherein a first component, comprising at least a first configuration data, and a first local server are located in the first sub-network, and a second component, comprising at least a second configuration data, and a second local server are located in the second sub-network;

storing the first configuration data on the first local server and, via the network connection, on the second local server, and storing the second configuration data on the second local server and, via the network connection, on the first local server;

interrupting the network connection;

updating, on the first local server, the first configuration data and the second configuration data;

re-connecting the network connection; and while the first configuration data on the second local server remains unchanged, overwriting the first configuration data on the second local server by the updated first configuration data.

The industrial plant may have a network that connects components within and/or of the industrial plant. Examples of components may comprise a vessel, a valve, a motor, a heater, a control element, a sensor, a variable frequency converter (drive), IT-infrastructure elements like servers, and/or further components. The network may be able to change configuration data of components. Examples of configuration data may comprise a maximum allowed speed or power of an electric motor, a control characteristic of a control element, network configuration details, credentials, allocation of logical signals on physical I/O cards, and/or further configuration data. The configuration data may be spread or distributed over several servers and/or other kind of computing machines. The distributed storing of the configuration data may contribute to a redundancy strategy, i.e. of the components and/or of the configuration data. The redundancy strategy of the components may, e.g., comprise to change a maximum and/or a current flow of a pump, e.g. for implementing a so-called "warm redundancy" strategy of several pumps. The redundancy strategy of the configuration data may, e.g., comprise to implement an error recognition and/or an error correction strategy, for instance a 2-of-3 strategy to select a "true" value of a configuration data, wherein the value is stored on three servers.

The plant's network may be split or partitioned into a plurality of sub-networks. To keep explanations simple, following considerations and explanations are limited to a "first" sub-network and a "second" sub-network. However, considerations and explanations apply also to a plurality—i.e. to any number—of sub-networks.

The partitioning of the network may be done according to one or several partitioning strategies and/or criteria. The partitioning strategies may consider or comprise, for instance, a spatial vicinity of the components, i.e. each factory building or factory room may have its sub-network. Additionally or as an alternative, the partitioning strategies may consider a functional relation or vicinity among the components, for example all components that implement one process phase may be arranged in one sub-network. All the sub-networks may be connected by a network connection, either directly ("one hop") or indirectly ("multiple hops"). In each one of the sub-networks at least a component and a local server may be located. A "server" may be any kind of computing machine, it may be hardware part and/or software part of any computing machine, and/or may be spread over more than one computing machine. For simplicity reasons, the component or the plurality of components located in the first sub-network are named "first component", its or their configuration data are named "first configuration data", the local server or the plurality of local servers located in the first sub-network is or are named "first local server". The analogous entities in the other sub-networks are named "second". These may comprise entities in one or more sub-networks. For instance, a 2-of-3 voter may consider the "first local server" and two "second local servers".

The first configuration data are stored on the first local server and on the second local server. The second local server is accessed via the network connection. The second configuration data are stored analogously, i.e. on the second local server and, via the network connection, on the first local server.

In case of interrupting the network connection, the second sub-network is no longer accessible. Interrupting the network connection may be caused by a network failure, e.g. due to a hardware or software fault, due to maintenance, and/or may be caused by other reasons. During the interrupting, the first configuration data and/or the second configuration data may be updated on the first local server, so that an updated first configuration data and/or an updated second configuration data is stored on the first local server. After re-connecting the network connection, the configuration data on the plurality of local servers need to be made consistent (again). The consistency may be achieved by applying one strategy, e.g. over the complete lifetime of this sub-network, network, or plant. The consistency strategy may be selected among several strategies and/or may be varied over the lifetime of the sub-network, network, or plant. The consistency strategy may comprise to check if the first configuration data on the second local server is unchanged, and, if yes, to overwrite the first configuration data on the second local server (or on all second local servers) by the updated first configuration data. The updated second configuration data may be kept untouched and/or may be subject of a consistency strategy of the second local server(s).

Note that "checking if the first configuration data on the second local server is unchanged" differs from checking if the first configuration data on the second local server has a different "age" than the first configuration data on the first local server, i.e. if it has been updated earlier or later. The "checking unchanged strategy" may advantageously lead to consistent configuration data—e.g. to consistent first configuration data—in all sub-networks without a need of comparing all replicas of the (first) configuration data against each other. This may contribute to a more robust and/or easy-to-implement consistency strategy on a plurality of replicas in a distributed control system (DCS).

In various embodiments, the method further comprising the step of: If the first configuration data on the second local server is older than the updated first configuration data, overwriting the first configuration data on the second local server by the updated first configuration data. This consistency strategy may advantageously consider the most recent update of the first configuration data on all the local servers of the sub-networks in this plant.

In various embodiments, the method further comprising the step of: If the first configuration data on the second local server has been changed, overwriting the first configuration data on the second local server by the updated first configuration data.

This overwriting strategy or consistency strategy may be based on an "ownership" concept of the configuration data, i.e. the local server that holds configuration data of the same sub-network may be considered as the "most authentic" local server. The "ownership strategy" may be in line with the partitioning strategy. Thus, the "ownership strategy" may lead to a dominant role of the local server of this sub-network. A reason for this dominant role may be that— e.g. in a spatial vicinity—the personnel caring for components of one hall of the configuration data may be the most competent one for configuration data of these components; or, —e.g. in a functional relation or vicinity—this may ensure functionality of one function or sub-process. Furthermore, it may be useful to ensure that local changes are still possible even in case of network partition to allow changes to production process even under those undesirable conditions.

In various embodiments, the method further comprising the step of: When overwriting the first configuration data or the second configuration data, writing said configuration data to a journal. The journal may hold all kind of changes in this network or plant. The journal may be secured, e.g. by a blockchain and/or other security mechanisms. The journal may advantageously enable service personnel and/or other people to trace and/or to comprehend changes (e.g. historical changes) of configuration data.

In various embodiments, the journal further comprises a timestamp of the overwriting time, an interrupting time, and a re-connecting time of the network connection. Thus, the journal may contribute to obtain a "global" view—inside the network or plant—of all changes of configuration data. This may be used for correcting recent changes, including automated changes, and/or may deliver information on particularly desired ("good") or undesired ("bad") behavior of processes within the plant.

In various embodiments, the partitioning of the network comprises to partition the network according to at least one of: a spatial vicinity of the components; a functional vicinity of the components; a security vicinity of the components; and/or organizational vicinity of the component.

The partitioning strategy that considers the spatial vicinity of the components may assigning a sub-network, e.g., to each factory building or factory room. The partitioning strategy that considers the functional relation or vicinity among the components may assigning a sub-network, e.g., to all components that implement one process, one process phase, and/or one sub-process in the network or plant. The partitioning strategy that considers the security vicinity of the components may assigning a sub-network, e.g., to all components behind one firewall. Organizational vicinity may consider shared personnel allowed to alter equipment configuration. The partitioning strategy may advantageously form a "zone of trust", within which the configuration data The advantages, benefits, and/or methods pointed out for configuration data may—to a reasonable extend—also be applied to other kind of data in a network or plant.

An aspect relates to a program element for executing the method as described above and/or below, when running the program element on a processing unit.

An aspect relates to a computer-readable storage medium where a program element, a computer program or a computer program product as described above is stored on.

An aspect relates to a first local server located in a first sub-network, which is part of a network in an industrial plant, wherein the first local server is configured to:

storing a first configuration data on the first local server and on a second local server located in a second sub-network, which is connected to the first local server via a network connection;

after interrupting the network connection, updating, on the first local server, the first configuration data; and after re-connecting the network connection, if the first configuration data on the second local server are unchanged, overwriting the first configuration data on the second local server by the updated first configuration data.

In some embodiments, the first local server is further configured to: If the first configuration data on the second local server is older than the updated first configuration data, overwriting the first configuration data on the second local server by the updated first configuration data.

In some embodiments, the first local server is further configured to: If the first configuration data on the second local server has been changed, overwriting the first configuration data on the second local server by the updated first configuration data.

An aspect relates to a central server, configured for storing a copy of a configuration data and of an updated first configuration data, when overwriting first configuration data.

In some embodiments, the copy of the configuration data further comprises a timestamp of an overwriting time of said configuration data, and of an interrupting time and a re-connecting time of the network connection.

In some embodiments, the central server comprises a journal, wherein the copy of said configuration data and, optionally, the timestamp, the interrupting time and the re-connecting time are stored in the journal, and wherein the journal is used as a basis for checking said configuration data. The checking of said configuration data may, e.g., comprise a checking for an alarm, a correction, a learning system, and/or other events that have occurred on the network or plant.

An aspect relates to a use of a local server described above and/or below and/or of a central server described above and/or below for synchronizing configuration data of components within an industrial plant.

For further clarification, the invention is described by means of embodiments shown in the figures. These embodiments are to be considered as examples only, but not as limiting.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for synchronizing configuration data of components within an industrial plant, the method comprising the steps of:

partitioning a network in the industrial plant into a first sub-network and a second sub-network, said sub-networks connected by a network connection, providing a first component, the first component comprising at least a first configuration data, and a first local server, wherein the first component and the first server are located in the first sub-network, providing a second component, the second component comprising at least a second configuration data, and a second local server, wherein the second component and the second server are located in the second sub-network;

storing the first configuration data on the first local server and, via the network connection, on the second local server, storing the second configuration data on the second local server and, via the network connection, on the first local server;

interrupting the network connection;

updating, the first configuration data and the second configuration data on the first local server;

re-connecting the network connection;

while the first configuration data on the second local server is unchanged, overwriting the first configuration data on the second local server by the updated first configuration data; and when the first configuration data on the second local server has been changed, overwriting the first configuration data on the second local server by the updated first configuration data because the first server is an owner of the first configuration data, wherein the first configuration data is tagged with ownership information that indicates that the first server is the owner of the first configuration data, and wherein the ownership information indicates a role assigned to the first configuration data.

2. The method of claim 1, further comprising the step of overwriting the first configuration data on the second local server by the updated first configuration data when the first configuration data on the second local server is older than the updated first configuration data.

3. The method of claim 1, further comprising the step of writing said configuration data to a journal when overwriting the first configuration data or the second configuration data.

4. The method of claim 3, wherein the journal further comprises a timestamp of the overwriting time, an interrupting time, and a re-connecting time of the network connection.

5. The method of claim 1, wherein the partitioning of the network comprises partitioning the network according to at least one of:

a spatial vicinity of the first and second components;

a functional vicinity of the first and second components;

a security vicinity of the first and second components; and an organizational vicinity of the first and second components.

6. The method of claim 1, further comprising:

updating, the first configuration data and the second configuration data on the second local server when the internet connection is interrupted; and upon reconnecting the network connection, while the second configuration data on the first local server is unchanged, overwriting the second configuration data on the first local server by the updated second configuration data.

7. The method of claim 6, further comprising:

when the second configuration data on the first local server has been changed, overwriting the second configuration data on the first local server by the updated second configuration data because the second server is a second owner of the second configuration data.

8. The method of claim 7, wherein the second local server being the second owner of the second configuration data comprises that the second local server has a dominant role with respect to accuracy of the second configuration data.

9. The method of claim 1, wherein the first local server being the owner of the first configuration data comprises that the first local server has a dominant role with respect to accuracy of the first configuration data.

10. A system for synchronizing configuration data of components within an industrial plant, the system comprising:

a first local server located in a first sub-network, the first sub-network being part of a network in an industrial plant, wherein the first local server comprises a hardware part and software part of a first computing machine, and the first local server is configured and operates to:

store a first configuration data on the first local server and on a second local server located in a second sub-network, wherein the second local server comprises a hardware part and software part of a second computing machine, and wherein the second sub-network is connected to the first local server via a network connection;

interrupt the network connection;

after interrupting the network connection, update the first configuration data on the first local server;

re-connect the network connection;

after re-connecting the network connection, determine whether the first configuration data on the second local server are unchanged, and if they are, overwrite the first configuration data on the second local server by the updated first configuration data, and when the first configuration data on the second local server has been changed, overwriting the first configuration data on the second local server by the updated first configuration data because the first server is an owner of the first configuration data, wherein the first configuration data is tagged with ownership information that indicates that the first server is the owner of the first configuration data, and wherein the ownership information indicates a role assigned to the first configuration data.

11. The system of claim 10, wherein the first local server is further configured to overwrite the first configuration data on the second local server by the updated first configuration data if a determination is made that the first configuration data on the second local server is older than the updated first configuration data.

12. The system of claim 10, wherein the first local server is further configured to overwrite the first configuration data on the second local server by the updated first configuration data when it is determined that the first configuration data on the second local server has been changed.

13. The system of claim 10, further comprising a central server, the central server being communicatively associated with the first and second local servers, the central server configured for storing a copy of a configuration data and of an updated first configuration data when overwriting the first configuration data.

14. The system of claim 13, wherein the copy of the configuration data further comprises a timestamp of an overwriting time of said configuration data, and of an interrupting time and a re-connecting time of the network connection.

15. The system of claim 14, wherein the central server comprises a journal, wherein the copy of said configuration data, the timestamp, interrupting time and the re-connecting time are stored in the journal.

16. The system of claim 15, wherein the journal is used as a basis for checking said configuration data in the first local server.

17. A method for synchronizing configuration data of components within an industrial plant, the method comprising the steps of:

partitioning a network in the industrial plant into a first sub-network and a second sub-network, said sub-networks connected by a network connection, providing a first component, the first component comprising at least a first configuration data, and a first local server, wherein the first component and the first server are located in the first sub-network, providing a second component, the second component comprising at least a second configuration data, and a second local server, wherein the second component and the second server are located in the second sub-network;

storing the first configuration data on the first local server and, via the network connection, on the second local server, storing the second configuration data on the second local server and, via the network connection, on the first local server;

interrupting the network connection;

updating, the first configuration data and the second configuration data on the first local server;

re-connecting the network connection;

while the first configuration data on the second local server is unchanged, overwriting the first configuration data on the second local server by the updated first configuration data;

when the first configuration data on the second local server has been changed, overwriting the first configuration data on the second local server by the updated first configuration data because the first server is an owner of the first configuration data, wherein the first configuration data is tagged with ownership information that indicates that the first server is the owner of the first configuration data, and wherein the ownership information indicates a role assigned to the first configuration data;

updating, the first configuration data and the second configuration data on the second local server when the internet connection is interrupted; and upon reconnecting the network connection, while the second configuration data on the first local server is unchanged, overwriting the second configuration data on the first local server by the updated second configuration data.

* * * * *